United States Patent [19]

Peterson et al.

[11] 4,185,589
[45] Jan. 29, 1980

[54] METHOD AND APPARATUS FOR HEATING A NIPPLE VALVE LIVESTOCK WATERER

[75] Inventors: Jerry D. Peterson, Conrad; Gerald L. Knief, Grundy Center, both of Iowa

[73] Assignee: Ritchie Industries, Inc., Conrad, Iowa

[21] Appl. No.: 750,834

[22] Filed: Dec. 15, 1976

[51] Int. Cl.² .......................... A01K 7/00; A01K 7/06
[52] U.S. Cl. ....................................................... 119/73
[58] Field of Search ......................... 118/72, 73, 74, 75

[56] References Cited

U.S. PATENT DOCUMENTS

| | | | |
|---|---|---|---|
| 2,479,355 | 8/1949 | Hemker | 119/73 |
| 2,674,227 | 4/1954 | Saunders et al. | 119/73 |
| 3,636,312 | 1/1972 | Dreher et al. | 119/73 |
| 3,691,997 | 9/1972 | Hatch | 119/73 |

Primary Examiner—Russell R. Kinsey
Assistant Examiner—Robert P. Swiatek
Attorney, Agent, or Firm—Trexler, Wolters, Bushnell & Fosse, Ltd.

[57] ABSTRACT

A method and apparatus for heating an animal waterer of a type having an enclosed housing with a plurality of nipple valves extending outwardly of the housing for allowing animals to drink directly therefrom. The heat sink coupling is disposed interiorly of the housing and is connected to a water supply line at one end and a nipple valve at the opposite end. A rigid heater and a control means for such heater contacts the coupling; and heat is supplied to the coupling when the heater is activated. The control means senses the temperature at the outer surface of the coupling in the vicinity of the seating surface of the nipple valve and activates and deactivates the heater based on such temperature.

11 Claims, 5 Drawing Figures

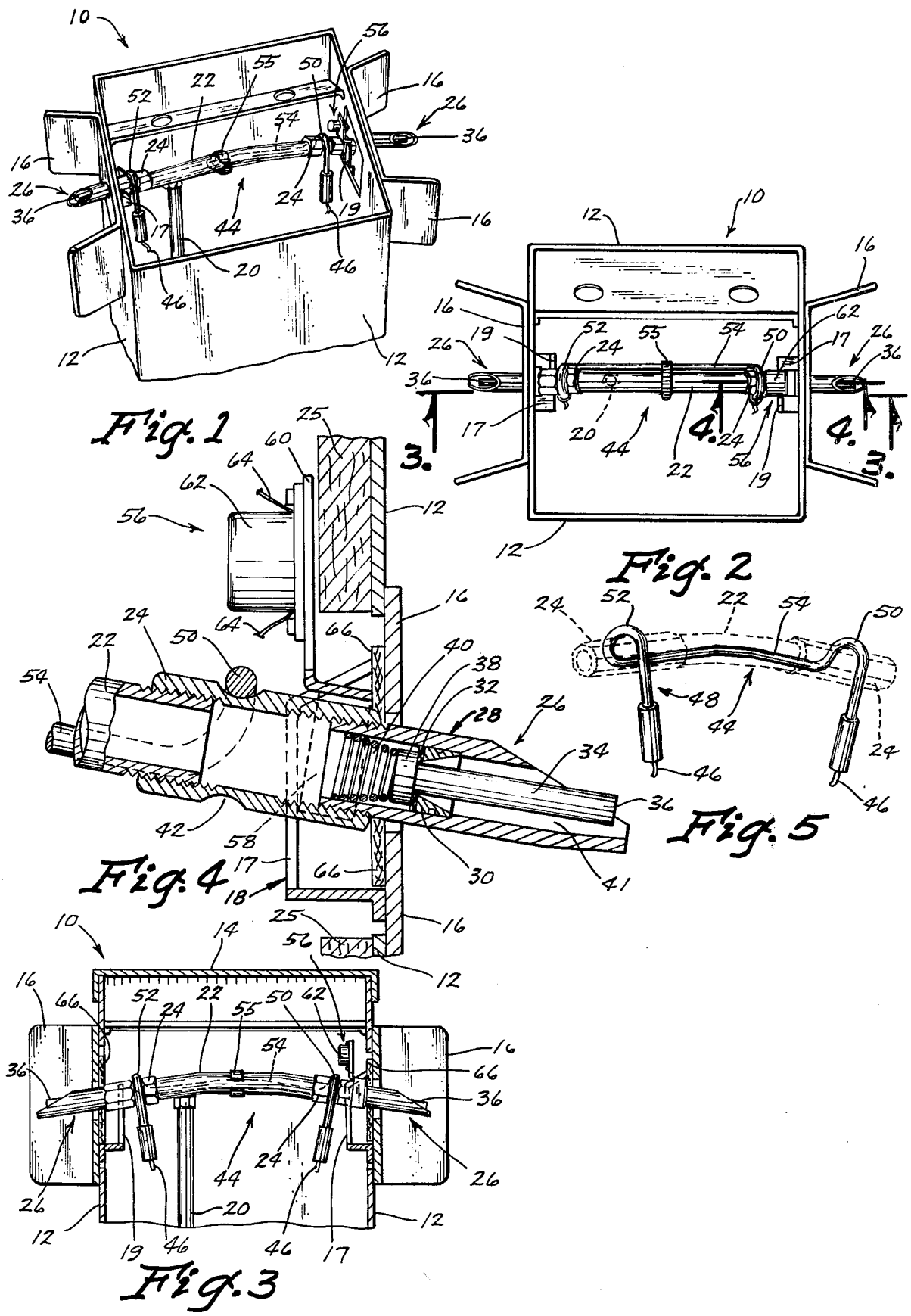

METHOD AND APPARATUS FOR HEATING A NIPPLE VALVE LIVESTOCK WATERER

BACKGROUND OF THE INVENTION

The present invention relates generally to animal waterers of the type commonly referred to as nipple waterers and more particularly to a method and apparatus for heating nipple waterers.

Nipple waterers supply clean water everytime the animal drinks and are, therefore, preferred over waterers of the bowl or trough-type. The most critical problem with the use of nipple valve waterers, however, is their tendency to freeze up when exposed to severe weather. Ice forms in the vicinity of the seating member of the nipple valve and prevents the animal from opening the valve.

Those concerned with this problem have used various methods and structures to prevent freeze up. One such method commonly used is to wrap the water supply piping with a heat tape. Use of a heat tape has proved unsatisfactory since the tape cannot be overlapped and, therefore, cannot supply adequate heat in the vicinity of the seating member of the nipple valve to prevent freezing under severe conditions. Further, under moderate weather conditions, heat tapes sometimes supply excessive heat to the piping and heat the water to high temperatures, resulting in the animals' refusal to drink. Other heating methods employed are cumbersome and inefficient to operate.

SUMMARY OF THE INVENTION

The present invention relates to a method and apparatus for heating an animal watering device to prevent freeze up under severe weather conditions. The waterer includes a housing having vertically disposed sidewalls and a cover disposed on the top thereof. At least one nipple valve extends outwardly from the housing to allow animals to drink directly therefrom. A heating apparatus is disposed interiorly of the housing and comprises a heat sink coupling connected to the nipple valve, and an electrical heater and thermostatic control both mounted in conjunction with the coupling and with each other. The thermostatic control senses the temperature of the outer surface of the coupling and controls the operation of the heater. The coupling is in close proximity to the seating member of the nipple valve, and as the coupling conducts its heat to the seating member, and vice versa, close control of the temperature of the coupling maintains the nipple valve animal waterer operable at all times.

An object of the present invention is to provide a heating apparatus which is easy to install and easy to service.

Another object is to provide a heating apparatus which supplies heat to the vicinity of the nipple valve in an efficient manner.

Still another object is to provide a heating apparatus which is efficient and economical to operate under both severe and moderate weather conditions.

A further object of the invention is the provision of a method of heating which results in an efficient, smooth operation of the heater.

Other objects, advantages and novel features of the present invention will become apparent from the following detailed description of the invention when considered in conjunction with the accompanying drawings.

BRIEF DESCRIPTION OF THE DRAWINGS

FIG. 1 is a partial perspective view of a waterer utilizing the method and heating apparatus of the present invention;

FIG. 2 is a top plan view of the waterer of FIG. 1;

FIG. 3 is a vertical sectional view taken along line 3—3 of FIG. 2;

FIG. 4 is an enlarged vertical sectional view taken along line 4—4 of FIG. 2; and FIG. 5 is a perspective view of the heater which is part of the heating apparatus of the present invention, water line portions being shown in phantom for clarity of illustration.

DESCRIPTION OF THE PREFERRED EMBODIMENT

Referring now to the drawings wherein like reference numerals designate identical or corresponding parts throughout the several views, FIG. 1 shows a nipple valve livestock waterer 10 employing the apparatus for heating the nipple valve waterer constructed in accordance with the present invention. The waterer 10 has a housing including a plurality of sidewalls 12 and a top cover 14 removably disposed on the top thereof. FIGS. 1-3 illustrate a two valve waterer 10 wherein oppositely opposed sidewalls 12 have rectangular openings therethrough and flange plates 16 disposed over such openings. The flange plates 16 are removably attached by bolts or the like and have circular openings therethrough and inwardly extending support members 18 which extend through the rectangular openings to the interior of the housing. The housing is mounted on a concrete platform and has a water supply entering the bottom thereof, as is described and illustrated in co-pending U.S. application Ser. No. 705,614 now U.S. Pat. No. 4,078,524. The two valve waterer 10, illustrated in the drawings and described in the specification, is used for illustrative purposes only; it being understood that the method and apparatus for heating the nipple valve waterer of the instant invention may be used in conjunction with a waterer having any number of nipple valve drinking outlets.

A flexible hose 20 is connected to the water supply and extends upwardly inside the housing, and is fluidly connected to a galvanized steel water supply line 22. The water supply line 22 is horizontally disposed interior of the housing and has an elevated central portion and downwardly sloping ends, such ends being externally threaded, as best seen in FIG. 4. Brass heat sink couplings 24, having female threaded ends, are attached to the ends of the water supply line 22. Conventional stainless steel nipple valves 26 are fluidly connected in a sealed manner to the couplings 24 and extend from the interior of the housing through the rectangular openings in the sidewalls 12 and through the circular openings in the flange plates 16 to the exterior thereof. Couplings 24 rest on the support members 18 which provide vertical support for the plumbing structure. The support member 18 has a first ear 17 which extends back toward the flange plate 16 and a second ear 19 which extends upwardly parallel to the flange plate 16.

The interior of the housing is lined with insulation 25; however, it is shown only in FIG. 4 for purposes of clarity.

As most clearly shown in FIGS. 1 and 3, the flexible hose 20 is offset to one side of the center of the water supply line 22. This offset arrangement permits the use of the heating apparatus of the present invention on a four valve waterer since the flexible hose 20 will not interfere with a second water supply line extending below and perpendicular to the water supply line 22.

The nipple valves 26 are of the type illustrated in FIG. 4 The nipple valve 26 includes an elongated cylindrical body 28 having one end externally threaded and the opposite end beveled. An annular ring 30 having a seating surface 32 is disposed inside the body 28. An actuating member 34, having an elongated shaft 36 extending exterior to the beveled end and having a seating plug 38, engages the annular ring 30; and a spring 40 biases the seating plug 38 toward the seating surface 32. Thus, the nipple valve 26 is closed at all times except when an animals' mouth contacts the actuating member 34 and moves the plug 38 at least partly out of engagement with the seating surface 32. Water under pressure behind the plug 38 is then allowed to move through the ring 30 and out beveled end opening 41.

The nipple valve 26 is disposed to slope downwardly to allow the water to drain by gravity from that portion of the valve body 28 which surrounds the shaft 36. When outside temperatures drop below the freezing point of water, ice forms in the area around the seating surface 32, the seating plug 38, and the spring 40, and prevents the movement of the actuating member 34 and thus renders the nipple valve 26 inoperative. It is therefore desirable to provide heat to the area and to control the supply of heat based on the approximate temperature existing in this area.

As most clearly shown in FIG. 4, the heat sink coupling 24 surrounds the threaded end of the nipple valve body 28 which houses the seating surface 32, the seating plug 38, and the spring 40. The coupling 24 has an outer surface which is hexagonal in shape and has a greater wall thickness and mass than a conventional coupling. The outer surface of the coupling 24 has a recessed arcuate groove 42 which extends around the circumference thereof and is disposed approximately two-thirds of the distance away from the nipple valve end of the coupling 24.

FIG. 5 illustrates an electrical heater 44 particularly adapted to engage the couplings 24. The heater 44 has a heating element electrically connected to an electrical power source (not shown) by conductive wires 46. The heating element is encased in a rigid tubular casing 48 having a first arcuate portion 50 and a second arcuate portion 52 connected by an intermediate portion 54. The first and second arcuate portions 50 and 52 are semicircular in shape and are disposed normal to the plane of the intermediate portion 54. As shown in FIGS. 1–3, the first and second arcuate portions 50 and 52 are in contact with and frictionally engage the arcuate grooves 42 of the couplings 24 connected at opposite ends of the water supply line 22; and the intermediate portion 54 is spaced from and extends essentially parallel to the water supply line 22. A clamp 55 engages both the water supply line 22 and the intermediate portion 54 and provides additional support for the heater 44.

FIG. 4 shows a temperature activated control means 56 which includes a heat conductive support bracket having a bifurcated end 58 and an upwardly extending mounting plate 60. The bifurcated end 58 contacts and frictionally engages the opposite flats of hexagonal coupling 24 between the arcuate groove 42 and the nipple valve 26. A conventional bimetal thermostat 62 is attached to mounting plate 60 and electrical conductive wires 64 extend from thermostat 62 to the electrical power source, such that the thermostat 62 controls the supply of power to the heating element of heater 44 in a conventional manner.

The heater 44 and the control means 56 can be easily attached to or removed from the couplings 24 since they are clipped onto and frictionally engage the couplings 24. This clip-on arrangement provides for simplified installation; and also, simplified removal of the heater 44 and control means 56 for maintenance purposes.

As most clearly shown in FIG. 4, a resilient heat insulating member 66 is disposed between the flange plate 16 and the edge of each coupling 24 and is held in position by first ear 17 of support member 18. The insulating member 66 has a circular opening therethrough which receives the nipple valve 26 such that the edge formed by the circular opening contacts the circumferential section of the nipple valve 26. The insulating member 66 thus minimizes the flow of heat by conduction between the coupling 24 and the flange plate 16. Further, the insulating member 66 absorbs the shock of animal contact with the nipple valve 26 and fills any void between the coupling 24 and the flange plate 16 which might exist due to manufacturing tolerances.

In operation, the thermostat 62 is set at a predetermined temperature, below which the thermostat 62 closes an electrical circuit and activates the electrical heater 44. The thermostat 62 senses the temperature of the outer surface of the coupling 24 near the seating surface 32 of the nipple valve 26; since the heat conductive support bracket, upon which the thermostat 62 is mounted, is in contact with the outer surface of coupling 24, that coupling 24 is maintained at an approximately equal temperature by conduction. The thermostat 62 is therefore responsive to temperature changes of the outer surface of coupling 24, rather than the temperatures of the air inside the housing or the temperature of the water supplied to waterer 10. It is understood, however, that such air and water temperatures will have an effect on the temperature of coupling 24.

When the heater 44 is activated, the couplings 24 are heated by conduction by the first and second arcuate portions 50 and 52; and the water supply line 22 is heated by radiation by the intermediate portion 54. The couplings 24 act as a heat sink in dissipating heat from the heater 44 and storing the heat to level out the operation of the heater 44. Heat stored in a heat sink coupling 24 is transmitted by conduction to the water inside the coupling 24 and to the nipple valve 26 in the vicinity of the seating surface 32. When the temperature of the outside surface of the coupling 24 rises above the predetermined temperature, the thermostat 62 opens the electrical circuit and deactivates the heater 44.

It can, thus, be seen that the heating apparatus of the present invention senses the temperature of the coupling 24 and supplies heat to the coupling 24 when it drops below a predetermined temperature. Since the coupling 24 stores the heat supplied, it serves to level out the operation of the heater 44 and results in an efficient method of heating a nipple valve livestock waterer 10 heretofore unknown to those in the art.

The design of the heat sink coupling 24 was selected based on testing and experimentation rather than by calculation of heat transfer requirements assuming certain unknowns. In a conventional nipple valve livestock waterer 10 having a one-half inch nominal pipe size water supply line 22 and nipple valve 26, and an eight inch square insulated housing; heat sink couplings 24 machined from one and one-half inch long sections of one inch hexagonal brass stock, provided a heat sink, used in conjunction with 150 watt heating element, sufficient to prevent freezing of nipple valves 26 when outside temperatures were as low as minus 12 degrees Fahrenheit with winds of 30 miles per hour—conditions equivalent to temperatures of 70 degrees Fahrenheit below the freezing point of water.

Experimentation has also shown that the heating apparatus of the present invention operates most efficiently when the thermostat 62 is set to activate the heater 44 when a temperature of the outer surface of the heat sink coupling 24 reaches 33 degrees Fahrenheit. This setting results in economical operation while preventing freeze-up of the waterer 10.

Obviously, many modifications and variations of the present invention are possible in light of the above teachings. It is therefore to be understood that, within the scope of the appended claims the invention may be practiced otherwise than as specifically described.

We claim:

1. A nipple valve heating apparatus comprising: first and second nipple valves mounted in spaced relation to one another; a water supply line leading to the nipple valves; a first heat sink coupling fluidly connected at one end to said first nipple valve and fluidly connected at the opposite end to said water supply line; a second heat sink coupling fluidly connected at one end to said water supply line and fluidly connected at the opposite end to said second nipple valve; an electrical heater adapted to be connected to an electric power source and including a first arcuate portion contacting a circumferential section of said first coupling, a second arcuate portion contacting a circumferential section of said second coupling, and an intermediate portion connecting said first and second arcuate portions and disposed essentially parallel to said water supply line; and temperature activated control means adapted to be connected to the power source and adapted to sense the temperature of a coupling, said control means operable to control the operation of said heater in relation to the temperature of a coupling.

2. A nipple valve heating apparatus of claim 1 wherein:
said first arcuate portion of said heater is rigid and semicircular in shape and frictionally engages said first coupling; and
said second arcuate portion of said heater is rigid and semi-circular in shape and frictionally engages said second coupling.

3. The nipple valve heating apparatus of claim 2 wherein:
said first coupling has a polygonal outer surface and has a first recessed arcuate groove extending around the circumference thereof, said first arcuate groove being disposed intermediate the ends of said first coupling;
said second coupling has a polygonal outer surface and has a second recessed arcuate groove extending around the circumference thereof, said second arcuate groove being disposed intermediate the ends of said second coupling;

said first arcuate portion of said heater is semi-circular in shape and is disposed in contact with and frictionally engages said first arcuate groove; and
said second arcuate portion of said heater is semi-circular in shape and is disposed in contact with and frictionally engages said second arcuate groove.

4. The nipple valve heating apparatus of claim 1 wherein said temperature activated control means comprises:
a heat conducting support bracket having a bifurcated end in contact with and frictionally engaging the outer surface of said second coupling, and including an upwardly extending mounting plate; and
a thermostat mounted on said mounting plate for controlling the supply of electrical power to said heater.

5. The nipple valve heating apparatus of claim 1 further comprising:
a first resilient heat insulating member having an opening therethrough said first insulating member surrounding said first nipple valve at the point of connection to said first coupling and extending radially outwardly therefrom against an adjacent flange plate; and
a second resilient heat insulating member having an opening therethrough said second insulating member surrounding said second nipple valve at the point of connection to said second coupling and extending radially outwardly therefrom against an adjacent flange plate.

6. A nipple valve heating apparatus comprising: a heat sink coupling fluidly connected at one end to a nipple valve and fluidly connected at the opposite end to a water supply line, said coupling and said valve in heat conductive relationship; an electrical heater adapted to be connected to an electrical power source and including at least one arcuate portion contacting a circumferential section of said coupling for transferring heat from the heater to the coupling and from the coupling to the valve; and temperature activated control means adapted to be connected to the power source and adapted to sense the temperature of said coupling, said temperature activated control means including a heat conducting support bracket having a bifurcated end in contact with and frictionally engaging the outer surface of said coupling, and including an upwardly extending mounting plate, and a thermostat mounted on said mounting plate for controlling the supply of electrical power to said heater.

7. The nipple valve heating apparatus of claim 1 wherein said arcuate portion of said heater is rigid and semi-circular in shape and is frictionally engaged with said coupling.

8. The nipple valve heating apparatus of claim 7 wherein:
said coupling has a polygonal outer surface and has a recessed arcuate groove extending around the circumference thereof, said arcuate groove being disposed intermediate the ends of said coupling; and
said arcuate portion of said heater is disposed in contact with and frictionally engages said arcuate groove.

9. The nipple valve heater of claim 1 further comprising a resilient heat insulating member having an opening therethrough, said insulating member surrounding said nipple valve at the point of connection to said coupling and extending radially outward therefrom.

10. A nipple valve heating apparatus comprising: a housing having a sidewall, a heat sink coupling located inside the housing, a nipple valve connected to the heat sink coupling at one coupling end in heat and in fluid conductive relationships, the valve extending at least partly through the housing sidewall, the heat sink coupling being fluidly connected to a water supply line at an opposite coupling end, an electrical heater located inside the housing, adapted to be connected to an electric power source and engaging said coupling for transferring heat from the heater to the valve, and temperature activated control means located inside the housing and adapted to be connected to the power source, adapted to sense the temperature of said coupling, and operable to control the operation of said heater in relation to the temperature of the coupling and valve, said temperature activated control means having a heat conducting support bracket frictionally engaging the outer surface of said coupling and including a mounting plate, and a thermostat mounted on said mounting plate for controlling the supply of electrical power to said heater.

11. A nipple valve heating apparatus according to claim 10 wherein said heater includes at least one arcuate portion in physical contact with a circumferential section of said coupling.

* * * * *